(12) United States Patent
Yang et al.

(10) Patent No.: US 10,472,448 B2
(45) Date of Patent: Nov. 12, 2019

(54) SURFACE-MODIFICATION OF PRINTED OBJECTS

(71) Applicant: The University of Western Ontario, London (CA)

(72) Inventors: Jun Yang, London (CA); Xiaolong Wang, London (CA); Xiaobing Cai, London (CA); Qiuquan Guo, London (CA)

(73) Assignee: The University of Western Ontario, London (CA)

( * ) Notice: Subject to any disclaimer, the term of this patent is extended or adjusted under 35 U.S.C. 154(b) by 787 days.

(21) Appl. No.: 14/455,707

(22) Filed: Aug. 8, 2014

(65) Prior Publication Data
US 2015/0079362 A1    Mar. 19, 2015

Related U.S. Application Data

(60) Provisional application No. 61/878,266, filed on Sep. 16, 2013.

(51) Int. Cl.
| | | |
|---|---|---|
| B29K 35/00 | (2006.01) | |
| B29K 105/00 | (2006.01) | |
| B29K 105/24 | (2006.01) | |
| C08F 267/06 | (2006.01) | |
| B33Y 10/00 | (2015.01) | |
| B33Y 80/00 | (2015.01) | |

(52) U.S. Cl.
CPC ........ *C08F 267/06* (2013.01); *B29K 2035/00* (2013.01); *B29K 2105/0002* (2013.01); *B29K 2105/0058* (2013.01); *B29K 2105/24* (2013.01); *B33Y 10/00* (2014.12); *B33Y 80/00* (2014.12); *Y10T 428/24802* (2015.01); *Y10T 428/24917* (2015.01)

(58) Field of Classification Search
CPC ........ B29K 2035/00; B29K 2105/0002; B29K 2105/0058; B29K 2105/24; B29C 64/10–194; B29C 64/30–393
See application file for complete search history.

(56) References Cited

U.S. PATENT DOCUMENTS

| | | | | |
|---|---|---|---|---|
| 2009/0197055 | A1* | 8/2009 | Yokoi ..................... | C08L 83/12 428/195.1 |
| 2011/0033887 | A1* | 2/2011 | Fang .................. | B01L 3/502707 435/41 |

(Continued)

OTHER PUBLICATIONS

Wang et al, i3DP, a robust 3d printing approach enabling genetic post-printing surface modification, Aug. 2013, Chem Commun, 46, pp. 10064-10066.*

(Continued)

*Primary Examiner* — Dah-Wei D. Yuan
*Assistant Examiner* — Nga Leung V Law
(74) *Attorney, Agent, or Firm* — Fiala & Weaver P.L.L.C.

(57) ABSTRACT

Three dimensional printed objects having surface coatings, such as a hydrophobic coating or metalized surface, 3D printed substrates having an outer surface that can be tuned by application of such a coating, and methods for the fabrication of such objects and substrates are described. A surface initiator is incorporated into the 3D substrate during layer-by-layer printing, and the surface coated by surface-initiated atom transfer radical polymerization (SI-ATRP).

13 Claims, 8 Drawing Sheets

(56) References Cited

U.S. PATENT DOCUMENTS

| | | | | |
|---|---|---|---|---|
| 2013/0066045 | A1* | 3/2013 | Bellan | C09F 1/04 |
| | | | | 530/201 |
| 2014/0072777 | A1* | 3/2014 | Boday | C09D 11/106 |
| | | | | 428/195.1 |

OTHER PUBLICATIONS

Ohno et al, a versatile method of initiator fixation for surface-initiated living radical polymerization on polymreic substrates, 2010, Macromolecules, 43, pp. 5569-5574.*

Azzaroni et al, polyelectrolyte brushes as efficient ultrathin platforms for site selective copper electroless deposition, 2006, Langmuir, 22, pp. 6730-6733.*

Ahn et al., "Polycaprolactone Scaffolds Fabricated with an Advanced Electrohydrodynamic Direct-Printing Method for Bone Tissue Regeneration", American Chemical Society Publications, Biomacromolecules, vol. 12, Nov. 9, 2011, pp. 4256-4263.

Barahman et al., "Ratchetlike Slip Angle Anisotropy on Printed Superhydrophobic Surfaces", American Chemical Society, Langmuir, vol. 27, 2011, pp. 9902-9909.

Derby, "Printing and Prototyping of Tissues and Scaffolds", B. Science, vol. 338, Nov. 16, 2012, pp. 921-926.

Calvo et al., "Mesoporous Films and Polymer Brushes Helping Each Other to Modulate Ionic Transport in Nanoconfined Environments. An Interesting Example of Synergism in Functional Hybrid Assemblies", Journal American Chemical Society, vol. 131, 2009, pp. 10866-10868.

Campos et al., "Three-Dimensional Printing of Stem Cell-Laden Hydrogels Submerged in a Hydrophobic High-Density Fluid", IOP Publishing Ltd., Biofabrication, vol. 5, 2013, 12 Pages.

Fedorovich et al., "Evaluation of Photocrosslinked Lutrol Hydrogel for Tissue Printing Applications", American Chemical Society, Biomacromolecules, vol. 10, No. 7, 2009, pp. 1689-1696.

Geissler et al., "Patterning: Principles and Some New Developments", Advanced Materials, vol. 16, No. 5, Aug. 4, 2004, pp. 1249-1269.

Guo et al., "Paintable 3D Printed Structures via a Post-ATRP Process with Antimicrobial Function for Biomedical Applications", Journal of Materials Chemistry B, vol. 1, 2013, pp. 6644-6649.

Kitson et al., "Configurable 3D-Printed Millifluidic and Microfluidic 'Lab on a Chip' Reactionware Devices", Lab Chip, vol. 12, No. 18, 2012, pp. 3267-3271.

Li et al., "Electrochemically Mediated Atom Transfer Radical Polymerization on Nonconducting Substrates: Controlled Brush Growth through Catalyst Diffusion", Journal of the American Chemical Society, vol. 135, 2013, pp. 1708-1710.

Liu et al., "Tuning the Surface Chemistry of iPDMS for Improved Protein Microarray Performance", Journal of Materials Chemistry, vol. 22, 2012, pp. 6327-6334.

Lopes et al., "Integrating Stereolithography and Direct Print Technologies for 3D Structural Electronics Fabrication", Rapid Prototyping Journal, vol. 18, No. 2, 2012, pp. 129-143.

Melcher et al., "Fabrication of $Al_2O_3$-based composites by indirect 3D-printing", Materials Letters 60, 2006, pp. 572-575.

Ovsianikov et al., "Laser Printing of Cells into 3D Scaffolds", IOP Publishing Ltd., Biofabrication, vol. 2 (014104), Mar. 10, 2010, 8 pages.

Pham et al., "A Comparison of Rapid Prototyping Technologies", International Journal of Machine Tools & Manufacture, vol. 38, 1998, pp. 1257-1287.

Sun et al., "3D Printing of Interdigitated Li-Ion Microbattery Architectures", Advanced Materials, vol. 25, 2013, pp. 4539-4543.

Symes et al., "Integrated 3D-Printed Reactionware for Chemical Synthesis and Analysis", Nature Chemistry, vol. 4, Apr. 15, 2012, pp. 349-354.

Villar et al., "A Tissue-Like Printed Material", H. Science, vol. 340, Apr. 5, 2013, pp. 48-52.

Wang et al., "Controlled "Living" Radical Polymerization. Atom Transfer Radical Polymerization in the Presence of Transition-Metal Complexes", Journal American Chemical Society, vol. 117, 1995, pp. 5614-5615.

Wang et al., "i3DP, A Robust 3D Printing Approach Enabling Genetic Post-Printing Surface Modification", Chem. Commun., vol. 49, No. 86, 2013, pp. 10064-10066.

Wang et al., "Initiator-Integrated 3D Printing Enables the Formation of Complex Metallic Architectures", ACS Applied Materials & Interfaces, vol. 6, 2014, pp. 2583-2587.

Wang et al., "Stretchable Conductors with Ultrahigh Tensile Strain and Stable Metallic Conductance Enabled by Prestrained Polyelectrolyte Nanoplatforms", Advanced Materials, vol. 23, 2011, pp. 3090-3094.

Wu et al., "A Facile Method for Permanent and Functional Surface Modification of Poly(Dimethylsiloxane)", Journal American Chemical Society, vol. 129, No. 23, 2007, pp. 7226-7227.

Xin et al., "Reversibly Switchable Wettability", Journal Chemical Society Reviews, vol. 39, 2010, pp. 769-782.

Zhou et al., "Multicomponent Polymer Brushes", Journal of the American Chemical Society, vol. 128, No. 50, 2006, pp. 16253-16258.

Wu et al., "3D-Printing of Highly Uniform $CaSiO_3$ Ceramic Scaffolds: Preparation, Characterization and in Vivo Osteogenesis", Journal of Materials Chemistry, vol. 22, 2012, pp. 12288-12295.

* cited by examiner

SURFACE-MODIFICATION OF PRINTED OBJECTS

CROSS-REFERENCE TO RELATED APPLICATIONS

This application claims priority to U.S. Provisional Patent Application No. 61/878,266, filed Sep. 16, 2013, and entitled "Surface-Modification of Printed Objects," the entirety of which is incorporated by reference herein.

FIELD

This invention relates to three dimensional printed objects having surface coatings, such as a hydrophobic coating or metalized surface, 3D printed substrates having an outer surface and/or an interior surface that can be tuned by application of such a surface, and methods for the fabrication thereof.

BACKGROUND

Three-dimensional (3D) printing is becoming a powerful manufacturing technology for creating sophisticated, bespoke and low-cost objects that, if possible to manufacture at all, were traditionally made by complicated procedures and facilities.[1] The technology, with the capability of substantially changing the way in which materials are turned into devices, has recently been employed to develop various applications in both scientific and engineering fields such as tissue and scaffold engineering,[2-7] microfluidics,[8] chemical synthesis,[9] composites,[10,11] and electronics.[12-14] Several layer-by-layer printing strategies, based on different rapid prototyping technologies such as fused deposition modeling, polymer jet deposition, granular materials binding, and stereolithography, together with a variety of material/ink systems, have been developed to meet different requirements.[15]

SUMMARY

In a first aspect, the invention is a method of fabricating a three-dimensional printed object having a surface coating, the method comprising:

(i) copolymerizing a mixture of first and second molecules layer-by-layer, wherein the first molecule is a cross-linking first monomer and the second molecule is a second monomer comprising first and second functional groups wherein the first functional group links with the first monomer during the copolymerization to form an object substrate, the outer surface of the substrate being formed with the second functional group exposed for chemical reaction with a third molecule; and

(ii) reacting the third molecule with the second functional group to covalently link the third molecule to the surface of the object.

The copolymerization of step (i) is preferably promoted under first catalytic conditions while the reaction of the third molecule and the second functional group is promoted under second catalytic conditions. The copolymerization can thus be, for example, a photopolymerization while the second functional group of the second monomer and the third molecule form covalent bonds with each other during the reacting step (ii) by a metal-catalyzed reaction.

The third molecule can comprise a third monomer having a polymerizable functional group so that the functional group of the third molecule reacts with the second functional group to covalently link the third molecule to the surface of the object in reacting step (ii), and the functional group of the third molecule can be such that the third molecule undergoes homopolymerization in reacting step (ii) once an initial third molecule is covalently linked to the surface of the object.

In preferred aspects, the cross-linking first monomer is a diacrylate or a dimethacrylate. There can be more than one diacrylate or more than one dimethacrylate.

The first molecule can be one or more of the following diacrylates:

where n=1 to 100; m=1 to 100, p=1 to 100, and q=1 to 100.

It is possible for n, m, p and/or q to be in the range of from 1 to 90, 1 to 80, 1 to 70, 1 to 60, 1 to 50, 1 to 40, 1 to 30, 1 to 20, 1 to 10, 10 to 100, 10 to 90, 10 to 80, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, 50 to 60, 60 to 100, 60 to 90, 60 to 80, 60 to 70, 70 to 100, 70 to 90, 70 to 80, 80 to 100, or 80 to 90. It is possible for n, m, p and/or q to have an average value of about 2, about 4, about 6, about 8, about 10, about 12, about 15, about 20, about 25, about 30, about 35, about 40, about 45, about 50, about 55, about 60, about 65, about 70, about 75, about 80, about 85, about 90 or about 95.

The first functional group of the second molecule is preferably an ethylenic unsaturation, and the second functional group of the second molecule is preferably a surface initiator. The second functional group of the second molecule can be e.g., a C—Br group.

Br-containing vinyl-terminated initiator. The first monomer can include two terminal vinyl groups.

In embodiments, the photo-curable composition from which the object is made is about 5 wt % of the second monomer and the photo-curable composition is about 95 wt % of the first monomer.

In a preferred aspect, the first monomer is a diacrylate. The diacrylate can be selected from the group consisting of:

, and

Particular second molecules are 2-(2-bromoisobutyrloxy) ethyl methacrylate or 2-(2-bromoisobutyrloxy) ethyl acrylate.

The third molecule can have the formula $CH_2\!=\!C(CH_3)C(O)R$ wherein R is selected from the group consisting of:
—$O(CH_2CH_2O)_rH$ wherein r is from 1 to 50;
—$OCH_2CH_2CH_2SO_3K$;
—$OCH_2CH_2(CF_2)_tCF_3$, wherein t is from 1 to 7;
—$OCH_2CH_2N(CH_3)_3Cl$.

The first molecule and the second molecule can be present in the mixture of step (i) in a ratio of about 95:5 (wt %:wt %).

Where R is —$OCH_2CH_2N(CH_3)_3Cl$, the method can include, subsequent to step (ii), forming a metalized surface on the exterior of the object by electroless plating. The metalized surface can be e.g., copper or nickel. The step of forming the metalized surface can include exposing the product of step (ii) to $PdCl_4^{2-}$ and a salt of Cu(II) to $PdCl_4^{2-}$ and a salt of Ni(II).

Another aspect of the invention is an object comprising:
a three dimensional substrate comprising a first material comprising printed polymer layers cross-linked to each other; and
a surface coating comprising a second material covalently linked to the first material.

In an embodiment, the printed polymer comprises the reaction product of a layer-by-layer photo-curable composition comprising a first monomer having first and second cross-linkable groups and a second monomer having at least one linkable group and an initiator The second material includes a polymer that is the reaction product of a surface-initiated atom transfer radical polymerizable composition comprising a third monomer that is covalently linked to units of said second monomer located at the substrate surface. The cross-linkable groups and the linkable groups can be vinyl-groups, and the second monomer can be a where n=1 to 100; m=1 to 100, p=1 to 100, and q=1 to 100.

The second monomer can be 2-(2-bromoisobutyrloxy) ethyl methacrylate.

The third monomer from which the object is made can be $CH_2\!=\!C(CH_3)C(O)R$ wherein R is selected from the group consisting of:
—$O(CH_2CH_2O)_rH$ wherein r is from 1 to 50;
—$OCH_2CH_2CH_2SO_3K$;
—$OCH_2CH_2(CF_2)_tCF_3$, wherein t is from 1 to 7;
—$OCH_2CH_2N(CH_3)_3Cl$.

The surface coating of the object can be a metal layer secured to the second material by electroless plating. The metal can be e.g., nickel or copper.

In another aspect, the invention is a method of fabricating a three-dimensional printed object having a chemically reactive surface coating, the method comprising copolymerizing a mixture of first and second molecules layer-by-layer, wherein the first molecule is a cross-linking first monomer and the second molecule is a second monomer comprising first and second functional groups wherein the first functional group links with the first monomer during the copolymerization to form an object substrate, the outer surface of the substrate being formed with the second functional group exposed for chemical reaction with a third molecule. The various components used in the method can be as described above in connection with the first aspect.

In yet another aspect, the invention includes an object comprising a three dimensional substrate comprising a first material comprising the reaction product of a layer-by-layer photo-curable composition comprising a first monomer having first and second cross-linkable groups and a second monomer having at least one linkable group and an initiator, wherein the initiator is at the surface of object available for chemical reaction with a first molecule. The surface of the object can be tailored i.e., tuned to have desirable characteristics as described elsewhere herein so finds use as e.g., a tunable substrate.

The invention includes an object manufactured according to any method described herein.

In an embodiment, the invention is a method of fabricating a three-dimensional printed object having a chemically reactive surface coating. The method includes copolymerizing a mixture of first and second molecules layer-by-layer, wherein the first molecule is a cross-linking first monomer and the second molecule is a second monomer comprising first and second functional groups wherein the first functional group links with the first monomer during the copolymerization to form an object substrate, the outer surface of the substrate being formed with the second functional group exposed for chemical reaction with a third molecule.

The copolymerization can be promoted under first catalytic conditions, and the reaction of the third molecule and the second functional group can be promoted under second catalytic conditions. In a particular aspect, the copolymerization is a photopolymerization and the second functional group of the second monomer and the third molecule are capable of forming covalent bonds with each other in a metal-catalyzed reaction.

In an embodiment, the second functional group is selected to covalently link the third molecule to the surface of the object in a reacting step, and the functional group of the third molecule is selected to be capable of undergoing homopolymerization in the reacting step.

The cross-linking first monomer can be selected from the group consisting of diacrylates, including dimethacrylates, and preferably, the first molecule is a diacrylate selected from the group consisting of:

According to an aspect, the first functional group of the second molecule comprises an ethylenic unsaturation, and the second functional group of the second molecule comprises a surface initiator. The second functional group of the second molecule can include a C—X (halogen) group, preferably a C—Br group. A particular second molecule is 2-(2-bromoisobutyrloxy) ethyl methacrylate or 2-(2-bromoisobutyrloxy) ethyl acrylate.

According to another aspect, the invention is an object having a three dimensional substrate that includes a first material comprising the reaction product of a layer-by-layer photo-curable composition comprising a first monomer having first and second cross-linkable groups and a second monomer having at least one linkable group and an initiator, wherein the initiator is at the surface of object available for chemical reaction with a first molecule.

The cross-linkable groups and the linkable groups can be vinyl-groups. The second monomer can have a Br-containing vinyl-terminated initiator. The first monomer can include two terminal vinyl groups.

The photo-curable composition can be about 5 wt % of the second monomer and/or the photo-curable composition can be about 95 wt % of the first monomer.

In a preferred aspect, the first monomer is a diacrylate. Preferably, the diacrylate is selected from the group consisting of:

,

, and where n=1 to 100; m=1 to 100, p=1 to 100, and q=1 to 100.

where n=1 to 100; m=1 to 100, p=1 to 100, and q=1 to 100.

The second monomer can be 2-(2-bromoisobutyrloxy) ethyl methacrylate.

According to another aspect, the invention is a method of fabricating a three-dimensional printed object having a surface coating in which the method includes:

(A) forming a layer on an exposed surface of a three-dimensional printed object substrate, the substrate surface comprising first functional groups, and the layer comprising a mixture of (i) a cross-linking monomer comprising second and third functional groups, and (ii) an initiator comprising fourth and fifth functional groups; and The step of removing at least a portion of the solvent can include evaporating solvent subsequent to removing the immersed object from the liquid mixture.

According to an aspect, such a method can also include forming the three-dimensional printed object substrate prior to step (A), or it can include providing the three-dimensional printed object substrate that has been separately manufactured.

The cross-linking monomer can be as described above e.g., selected from the group consisting of diacrylates, including dimethacrylates. The cross-linking monomer can thus be a diacrylate selected from the group consisting of:

where n=1 to 100; m=1 to 100, p=1 to 100, and q=1 to 100.

(B) exposing the layered object to reaction conditions under which the first to fourth functional groups react to covalently link the monomer and initiator to the surface to form the surface coating on the exposed surface, the coating comprising exposed said fifth functional group.

The mixture is preferably a liquid mixture made up of a solvent in which the monomer and initiator are dissolved, and the step of forming the layer on the exposed surface includes removing at least a portion of the solvent prior to step (B).

Forming the layer on the exposed surface can include immersing the object in the liquid mixture, and can further include removing the immersed object from the liquid mixture prior to step (B).

The fourth functional group can comprise an ethylenic unsaturation, and the fifth functional group can comprise a surface initiator. In a preferred aspect, the fifth functional group includes a C—Br group. The initiator can be 2-(2-bromoisobutyrloxy) ethyl methacrylate, 2-(2-bromoisobutyrloxy) ethyl acrylate or a mixture of the two.

The method can further include exposing the coating formed in step (B) to a molecule selected to provide the surface of the object with a predetermined property, e.g., hydrophobicity, or a metalized coat. The molecule includes a sixth functional group, and the method includes reacting the fifth and sixth functional groups to covalently link the molecule to the surface coating of the substrate.

The method of claim 63, wherein the first, second, third and fourth functional groups are selected to react under a first set of conditions and the fifth and sixth functional groups are selected to react under a second set of conditions.

According to an aspect, the first set of conditions is photoactivation, and the second set of conditions is metal catalysis.

In a preferred aspect, and as described further above, the molecule selected to provide the surface of the object with a predetermined property comprises $CH_2=C(CH_3)C(O)R$ wherein R is selected from the group consisting of:
—O(CH$_2$CH$_2$O)$_r$H wherein r is from 1 to 50;
—OCH$_2$CH$_2$CH$_2$SO$_3$K;
—OCH$_2$CH$_2$(CF$_2$)$_t$CF$_3$, wherein t is from 1 to 7;
—OCH$_2$CH$_2$N(CH$_3$)$_3$Cl.

The invention also includes an object having:
a three dimensional substrate comprising a first material comprising printed polymer layers cross-linked to each other; and
a surface coating comprising a second material covalently linked to the first material.

In such object, (a) the printed polymer layers can comprise the reaction product of a layer-by-layer photo-curable first monomer having first and second cross-linkable groups; and (b) the covalent linkage can be the photo-reaction product of a second monomer and the printed polymer, said second monomer comprising a linkable group.

The cross-linkable groups and the linkable group can be vinyl-groups. The first monomer can include two terminal vinyl groups, and more particularly, can be a diacrylate. The diacrylate can selected as described above.

The second monomer can further comprise a surface initiator, and be as described elsewhere herein.

In such object, (a) the printed polymer can comprise the reaction product of a layer-by-layer photo-curable first monomer having first and second cross-linkable groups; (b) the covalent linkage can be the photo-reaction product of a second monomer and the printed polymer; and (c) the surface coating can further include a molecule covalently linked to the second monomer by a metal-catalyzed reaction.

The molecule covalently linked to the second monomer can be $CH_2=C(CH_3)C(O)R$ wherein R is selected from the group consisting of:
—O(CH$_2$CH$_2$O)$_r$H wherein r is from 1 to 50;
—OCH$_2$CH$_2$CH$_2$SO$_3$K;
—OCH$_2$CH$_2$(CF$_2$)$_t$CF$_3$, wherein t is from 1 to 7;
—OCH$_2$CH$_2$N(CH$_3$)$_3$Cl.

The surface coating can further comprise a metal layer secured to the second material by electroless plating. In preferred aspects, the metal comprises nickel or copper.

DETAILED DESCRIPTION

As mentioned above, it has been found to be possible to include an initiator as part of a resin mixture from which a 3D printed object is manufactured so that the initiator is available for chemical reaction at a substrate surface and can be used to modify the surface of the object. The scheme of FIG. 1, which shows particular processes carried out by the inventors, illustrates the invention.

An object is manufactured using a 3D printing process, the resin material used for printing containing a surface initiator. The printing is carried out in such a way that the moiety which takes part in the subsequent initiation of surface modification survives the printing process and is available for chemical reaction in the subsequent surface modification.

In the case of the illustrated embodiments, resins were commercially available diacrylates photo-polymerized layer-by-layer during the printing process. A resin and initiator are mixed in appropriate proportions prior to printing. In the illustrated embodiments, the resin and initiator are mixed to form a prepolymer resin, the diacrylate containing two vinyl groups and the initiator containing a single vinyl group which vinyl groups participate in the photo-polymerization of the printing process. The diacrylate is capable of cross-linking across layers during the printing process to create the object.

Figure 1:
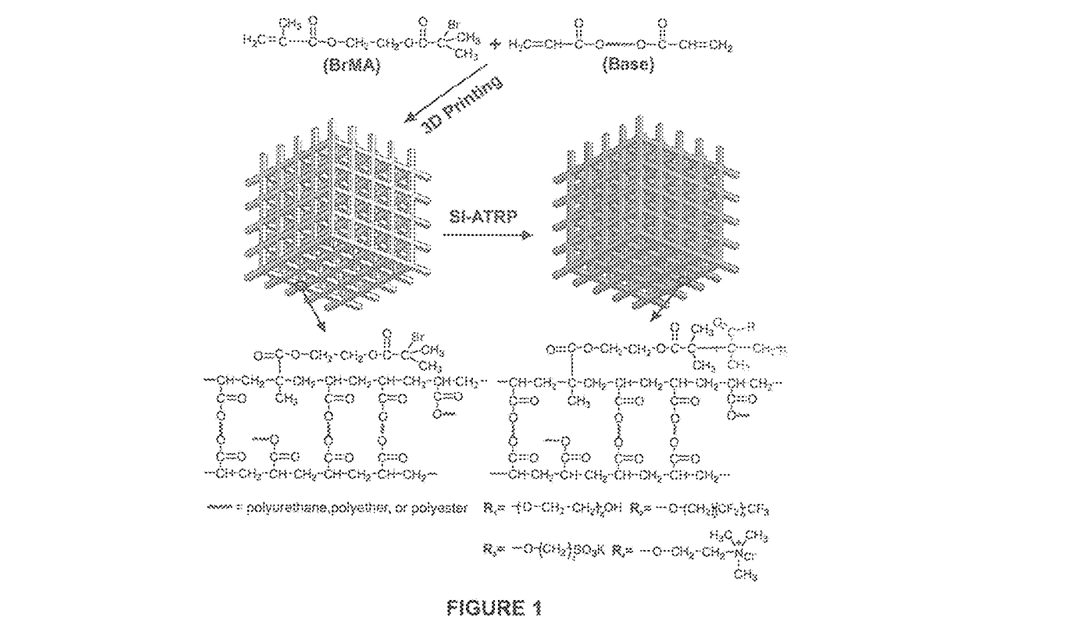
FIG. 1 is a schematic illustration of the preparation of 3D printed objects prepared via printing using an initiator integrated UV curable resin and subsequent SI-ATRP.

In illustrated embodiments, diacrylate moieties are covalently linked to each other by intervening polyester, polyether and polyurethane oligomers, shown in FIG. 1. The initiator of the illustrated prepolymer mixtures is also an acrylate, 2-(2-bromoisobutyryloxyl)ethyl methacrylate, which includes a vinyl group available for reaction during the photo-polymerization step. The vinyl unsaturation of the methacrylate monomer participates in the photo-polymerization reaction under a first set of reaction conditions during the printing process. The portion i.e. "C—Br" of a polymerized initiator molecule that appears at the surface of the object can participate in a subsequent surface modification step that is conducted under a second set of reaction conditions.

An example of growing polymer brushes via surface-initiated polymerization has been described previously,[16,17] and surface-initiated atom transfer radical polymerization (SI-ATRP) has been used for surface modification.[18-23]

Here, it has been established that it is feasible for a Br-containing vinyl-terminated initiator, namely 2-(2-bromoisobutyryloxyl)ethyl methacrylate (BrMA), to initiate ATRP, by mixing the initiator with resin base for the MiiCraft 3D printer. The resin base includes acrylate-based pre-polymers, cross linking agents and a phosphine oxide-based photoinitiator according to the manufacturer. As illustrated in the scheme of FIG. 1, the resin forms cross-linked networks with the initiator integrated both inside and on the surface of objects after UV curing, which is part of the 3D printing process. The outermost Br can then initiate the ATRP process to grow desired type(s) of polymer brushes on the surface of printed objects.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" or "example" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

EXAMPLES

The invention can be further understood by the skilled person with reference to the following examples, which are exemplary, and the inventors' technology is not limited in scope by the exemplified embodiments. Various modifications of the present technology in addition to those described herein will become apparent to those skilled in the art from this description and accompanying figures.

3D printer clear resin base was purchased from MiiCraft. All other chemicals and solvents were obtained from Sigma Aldrich and used as received except where noted. CuBr was purified by reflux in acetic acid. Initiator 2-(2-bromoisobutyryloxy) ethyl methacrylate (BrMA) and monomers, poly (ethylene glycol) methyl ether methacrylate (PEGMA, Average Mn 360) and 1H,1H,2H,2H-perfluorodecyl methacrylate (PFMA), 3-sulfopropyl methacrylate potassium salt (SPMA) and 2-(methacryloyloxy)ethyl-trimethyl-ammonium chloride (METAC), were passed through an aluminum oxide column to remove inhibitors prior to use.

Example 1

Preparation of 3D Printed Object

To prepare the initiator containing resin, BrMA is added into the resin base of MiiCraft 3D printer and mixed well. After degasing for 30 min in the dark, customized initiator containing resin was obtained. 5 wt % initiator containing resins were prepared and used for the 3D printing.

The MiiCraft 3D printer is based on stereolithography, which creates 3D objects by photo-polymerizing the acrylate-based liquid resin in a layer-by-layer sequence. A solid 3D model is designed using a CAD tool and digitally sliced into a series of 2D layers, which are then used to control the UV projection to solidify the liquid resin in a tank. After a layer is solidified at the bottom of the tank, an elevator moves downward to lift it up and a new circle starts to solidify the next layer in the same way until the whole body of 3D object is formed. For the 5 wt % initiator-containing resin, the exposure time for each layer is 3.5 seconds, and the lift height is 50 μm. Parameters normally used for MiiCraft resin base were found to be suitable in the following examples, indicating the initiators did not negatively impact the printing process as such. Once formed, the 3D printed object was ultrasonically rinsed using ethanol, to remove any physically absorbed resin and small molecular monomers, dried by nitrogen flow, and post cured by UV light for 15 min.

Surface-initiated Atom Transfer Radical Polymerization (SI-ATRP)

For PEGMA, a mixture of 4.4 g of PEGMA monomer and 10 mL of 1:4 (v:v) MeOH/H$_2$O was stirred in a flask under nitrogen for 20 min; then 64 mg of 2,2-bipyridyl and 28 mg of CuBr were charged into a flask and purged with nitrogen flow again; after 20 minutes, cubes prepared from the initiator-containing resin (i-cubes) were added into the mixture. Polymerization reactions were then performed at room temperature under nitrogen for 2 hours.

For PFMA, 1.56 g of PFMA were added to 15 mL of DMF, and stirred under argon for 20 min. Then, 78 mg of N,N,N',N'',N''-pentamethyldiethylenetriamine and 42 mg of CuBr were added to the solution. The mixture was then degassed by stirring under argon flow for 20 minutes before syringing into a Schlenk tube where i-cubes were already placed. Polymerization was carried out for 2 hours. After the polymerization, the materials were rinsed under nitrogen with methanol and water under ultrasound, and then dried at 60° C. in vacuum overnight to obtain the poly(PFMA) surface coated i-cube, or poly(PFMA)-i-cube.

For SPMA, 2.46 g of SPMA monomer and 6 mL of 1:2 (v:v) MeOH/H$_2$O mixture were stirred in a flask under nitrogen flow for 20 minutes. Then 78 mg of 2,2-bipyridyl and 24 mg of CuBr were charged into a flask and purged with nitrogen. I-cubes were added into the mixture 20 minutes later. Polymerizations were then performed at room temperature under nitrogen protection for 2 h.

For METAC, 4.6 g of METAC was dissolved in 5 mL of methanol at 20° C. and degassed for 20 minutes by passing a continuous stream of dry N$_2$ through the stirred solution. 2,2-Dipyridyl (0.24 g), and CuBr (0.06 g) were added to the solution. The mixture was then further stirred and degassed with a stream of dry N$_2$ for 15 minutes. The 3D printed initiator integrated samples were immersed into the mixture. Polymerizations were then performed at 60° C. under nitrogen for 4 hours.

Metallization (Electroless Plating)

The poly(METAC) coated 3D samples were first immersed into a 5 mM $(NH_4)_2PdCl_4$ aqueous solution for 15 min to load $PdCl_4^{2-}$. Then, after rinsing thoroughly with water, the $PdCl_4^{2-}$ moieties loaded samples were immersed into the house-made plating bath to obtain metallic architectures. The Cu plating bath contains a 1:1 mixture of freshly prepared solutions A and B. Solution A contains 12 g/L NaOH, 13 g/L $CuSO_4.5H_2O$ and 29 g/L potassium sodium tartrate. Solution B contains 9.5 mL/L HCHO in water. For electroless plating of Ni, the plating bath contains 40 g/L $Ni_2SO_4.5H_2O$, 20 g/L sodium citrate, 10 g/L lactic acid, and 1 g/L dimethylamine borane (DMAB) in water. A nickel stock solution of all components except the DMAB was prepared in advance. A DMAB aqueous solution was prepared separately. The stock solutions were prepared for a 4:1 volumetric proportion of nickel-to-reductant stocks in the final electroless bath.

Coating Initiator for Surface Modification

A 3D structure was printed using and without the inclusion of an initiator. The printed object was immersed into an ethanol solution containing both initiator and resin to coat a thin layer of initiator containing resin on the surface. Ethanol was evaporated by leaving the object in the air for a few minutes and the surface was then exposed to UV to cure the resin coated onto the surface of the object. The 3D object having the initiator coated thereon can be grafted with e.g., a functional polymer such as PEGMA, PFMA, SPMA, etc. using SI-ATRP to obtain the desired functionalized or tuned surface. This includes grafting of a polyelectrolyte layer e.g., poly(METAC) for metallization as described above.

Characterization

Surface chemical composition information of 3D cubes and i-cubes was obtained by X-ray photoelectron spectroscopy (XPS). The measurement was carried out using a Kratos Axis Ultra spectrometer using a monochromatic Al Kα radiation source. The binding energies were referenced to the C 1s line at 284.8 eV from adventitious carbon. Using an argon ion gun (Kratos Minibeam III) to etch the samples, the depth profile of i-cube was measured. The argon ion gun was operated at 4 kV and 15 mA emission current. The sputter area is 3 mm×3 mm. The sputter rate is 1.3 nm per min for $Al_2O_3$, while the etching depth for polymer is estimated about 5 nm per min. The wettability was valued by directly dropping deionized water dyed by Rhodamine 6G onto the samples and recorded by Canon camera. The sessile water contact angles were also measured by a Ramé-Hart Contact Angle Goniometer. The morphology of Cu coated PET was investigated using a Hitachi S-4500 field emission scanning electro-microscope using a 5 kV accelerating voltage.

Figure 2:
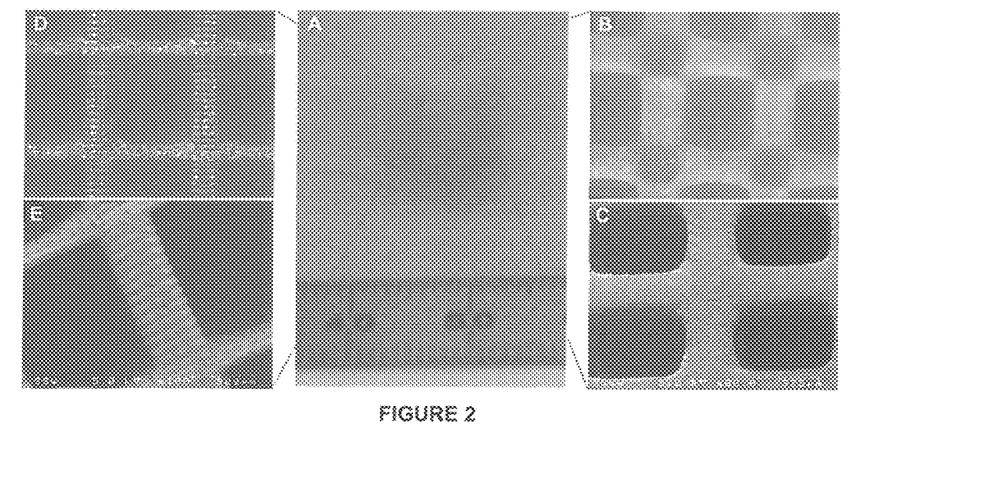
FIG. 2 shows a photograph of (A) a 3D printed i-cube, (B) microscope image of a top view of the cube; (C) SEM image of the top view; (D) a microscope image of a side view of the cube; and (E) SEM image of the side view (D, E).

Characteristics of i-cubes obtained are illustrated by the photographic and SEM images shown in FIG. 2.

Figure 3:
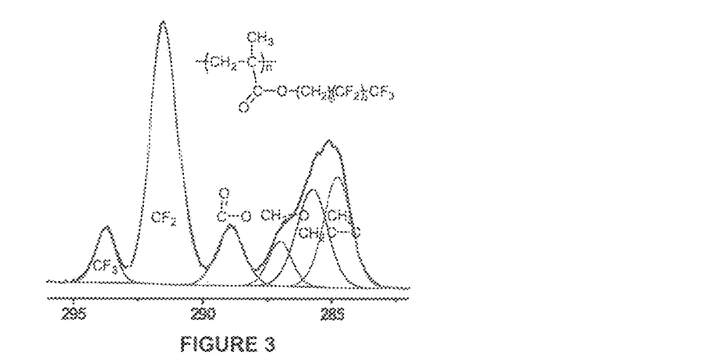
FIG. 3 shows an XPS C 1s high resolution spectrum of a poly(PFMA)-i-cube.
Figure 4:
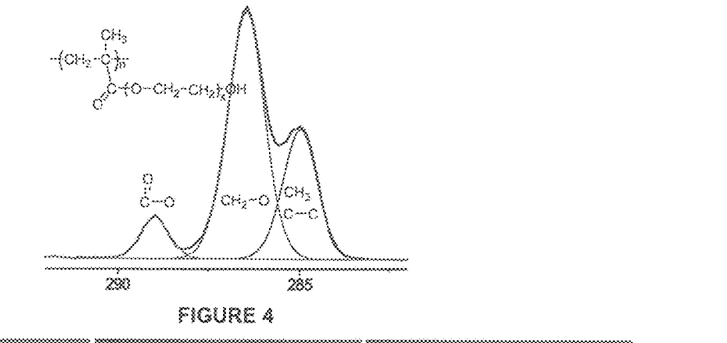
FIG. 4 shows an XPS C 1s high resolution spectrum of a poly(PEGMA)-i-cube.

XPS C is high resolution spectra of a poly(PFMA)-i-cube and a poly(PEGMA)-i-cube are shown in FIGS. 3 and 4.

Figure 5:
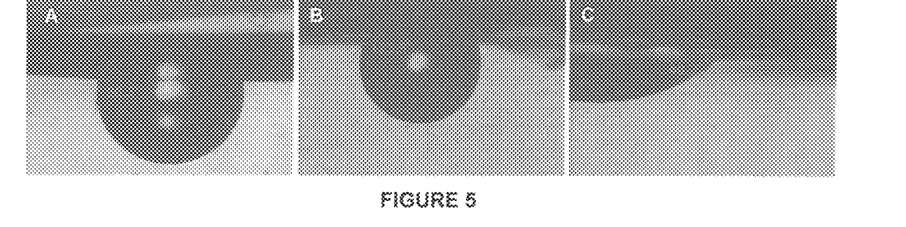
FIG. 5 shows water contact angles of flat films (A) prepared from 5 wt % BrMA resin; (B) the film of (A) with a poly(PFMA) surface coating; and (C) the film of (A) with a poly(PEGMA) surface coating, the coatings applied by grafting via SI-ATRP.

A comparison of water contact angles of a flat film corresponding to an i-cube (before surface modification), a poly(PFMA)-i-cube, and a poly(PEGMA)-i-cube is shown in FIG. 5.

Figure 6:
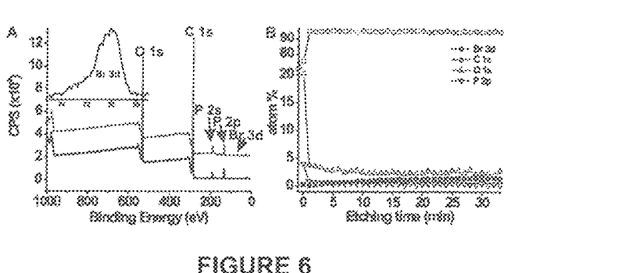
FIG. 6 shows (A) XPS survey spectra of 3D printed cube produced using resin without an initiator present (bottom curve) and i-cube (top curve). The inset is the high resolution of Br 3d of the i-cube; and (B) XPS depth profile of an i-cube by argon ion etching.

For successful surface modification i.e., to create an i-object having an outer surface that can be tunably modified, it is important for an initiator to be available at the surface of the i-object for chemical reaction. X-ray photoelectron spectroscopy (XPS) was carried out to characterize the surface composition of a 5 wt % BrMA integrated 3D printed i-cube. The survey scan showed the characteristic Br 3d peak at 70.3 eV (FIG. 6(A)) for the i-cube, which is completely absent for the printed cube by using the original resin base, the cube. The atom % of Br for the i-cube is 0.3% (Table 1), which has been shown sufficient to generate polymer brush-covered surfaces by SI-ATRP.[16] An argon ion gun was used to etch the i-cube and collect an XPS depth profile. The etching speed is estimated ~5 nm per min. After 1 minute of etching, the atom % of C sharply increased to 95.0%, while the other three elements O, P and Br, decreased to 3.8%, 0.9% and 0.1%, respectively. It was found that the atom % of C remained almost constant during the entire etching process, yet O and P kept decreasing and Br increasing. The atom % of Br reached the highest 1.1% ten minutes later. After that, the ratio of all the four elements became stable. The difference in chemical composition between the outermost surface and inner portion might result from the etching process or self-arrangement of chemical structure. Nevertheless, the characteristic signal of Br from the outermost surface to hundreds of nanometers beneath the surface verifies integration of the initiator throughout the material of 3D printed object.

TABLE 1

Surface chemical composition of 3D printed cube and i-cubes

| | atom %[a] | | | | |
|---|---|---|---|---|---|
| Samples | C | O | P | Br | F |
| Cube | 75.3 | 21.2 | 3.5 | | |
| i-Cube | 75.4 | 20.3 | 4.0 | 0.3 | |
| Poly(PFMA)-i-cube | 41.9 (42.4)[b] | 5.0 (6.1) | 0.0 | 0.1 | 53.0 (51.5) |
| Poly(PEGMA)-i-cube | 70.6 (66.7) | 29.1 (33.3) | 0.2 | 0.2 | |

[a]The atom % was calculated by using XPS survey spectra.
[b]The data shown in brackets are theoretical values.

Figure 7:
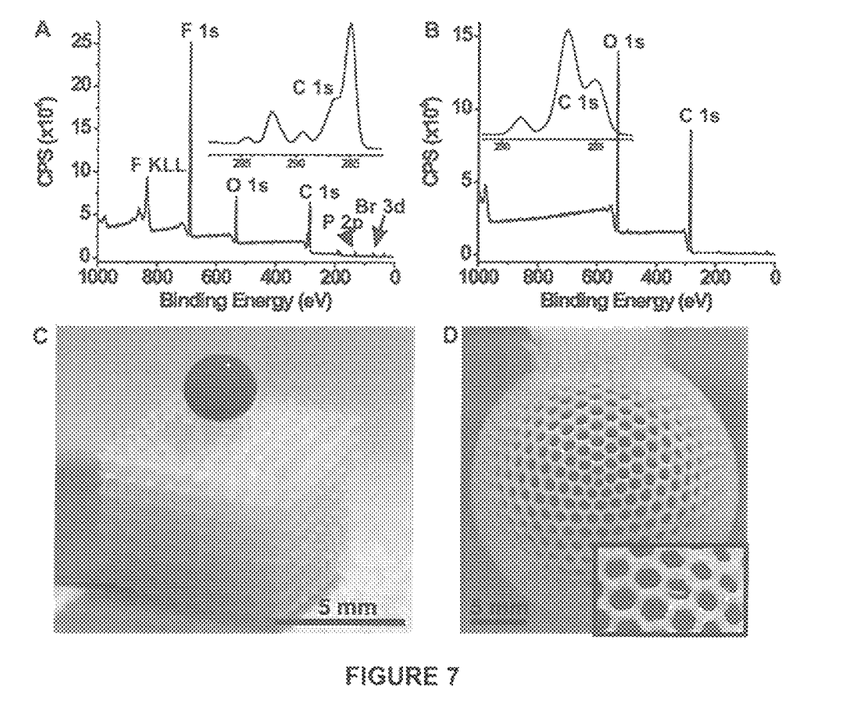
FIG. 7 shows XPS survey spectra of (A) poly(PFMA) and (B) poly(PEGMA) grafted i-cubes by SI-ATRP. Plates (C) and (D) are photographs of a dyed water droplet on the poly(PFMA) surface-modified i-cube and a dyed water filled poly(PFMA) modified hollow i-ball.

To functionalize the 3D printed objects, two representative monomers were selected to grow polymer coatings by SI-ATRP from the i-cube. Poly(ethylene glycol) methacrylate (PEGMA) can improve the biocompatibility of the structural material of object used as substrate. 1H,1H,2H,2H-perfluorodecyl methacrylate (PFMA) has the potential of lowering surface energy and increasing the hydrophobicity of the surface of the unmodified i-cube. The modified surfaces were first characterized by XPS. The strong F is signal at 689.4 eV (FIG. 7(A)) provides evidence of successful grafting of poly(PFMA) to the i-cube. The sharp decrease of atom % of P from 4.0% to almost zero indicates the formation of a dense poly(PFMA) coating on the surface. It was also found that the atom % of the poly(PFMA) coated i-cube were close to the theoretical values, a shown in Table 1, and the high resolution spectrum of C 1s can be seen. The evidence thus suggests that a uniform and dense poly (PFMA) coating was been grafted onto the i-cube surface. The grafting of poly(PEGMA) did not give such a characteristic XPS signal (FIG. 7(B)), however, the chemical composition after SI-ATRP of PEGMA closely corresponded with the calculated values of poly(PEGMA), as shown in Table 1, and the C 1 s high resolution spectrum agreed with the poly(PEGMA) as well.

Wetting performance of the surface-modified i-cubes was examined. The water droplet dropped on the poly(PEGMA)-grafted i-cube permeated into the network immediately, presumably because of its high hydrophilicity, while a sphere-shaped water droplet formed on the poly(PFMA)-grafted i-cube (FIG. 7(C)) showed an increase in hydrophobicity of the modified surface.

The functionalization of 3D printed structural materials provides multiple applications. For example, here, a 2.5 mm-diameter mesh ball (i-ball) comprised of hexagons with side lengths ranging from 1 to 1.5 mm was printed. After SI-ATRP of PFMA, it was found that the surface-modified i-ball could be completely filled with water without any leakage (FIG. 7(D)). The encapsulated water was found to flow freely inside the ball when shaken.

Figure 8:
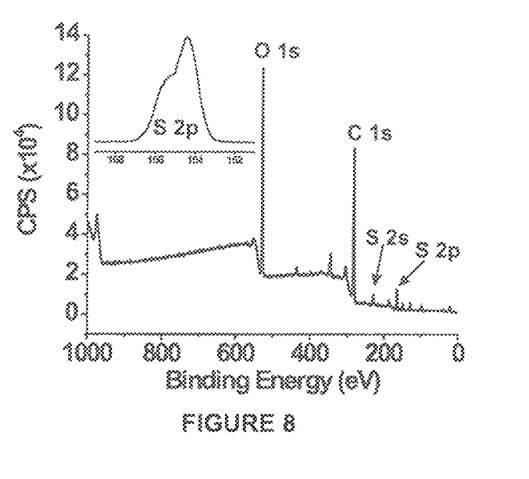
FIG. 8 is an XPS survey spectrum of poly(PSMA) grafted i-cube. The inset is the high resolution XPS spectrum in S 2p region.

In another approach to tuning surface properties of a printed object, poly(3-sulfopropyl methacrylate) poly (SPMA) was grafted by polymerization of SPMA onto an i-cube surface. The XPS showed successful grafting of poly(SPMA) to the i-cube surface (FIG. 8). The unique S 2p signal at 164.5 eV is attributable to the formation of poly (SPMA) on the surface of the i-cube.

Antibacterial properties of i-cubes having poly(SPMA)-modified and unmodified surfaces against Gram-positive *B. subtilis* (ATCC 6633) and Gram-negative *E. coli* (ATCC 29425) were used as model organisms to perform the adhesion test. The bacteria strain was precultured in 50 mL of nutrient broth (BD Difco™) at 37° C. for 18 h in shaking water bath. The bacteria were harvested by centrifugation for 5 min at 5,000 rpm; then the bacteria sediment was washed twice with PBS by centrifuging at 3000 rpm for 15 min. After removing the supernatant, the cells were resuspended in PBS and the bacterial concentration was measured by $OD_{600}$. It is known that $OD_{600}$ of 0.4 is equivalent to approximately $2 \times 10^8$ bacteria ml$^-$ based on our standard curve determined by UV-visible spectrometry. Both the control sample and poly(SPMA) coated samples were immersed into bacteria solution ($10^8$ bacteria ml$^{-1}$) for around 1-2 hour. The solution was shaken every 10-15 min to avoid over sedimentation of bacteria. After that, the samples were rinsed with deionized water three times to remove the bacteria suspension from the surface. The samples were dried in the air for later imaging.

Figure 9:
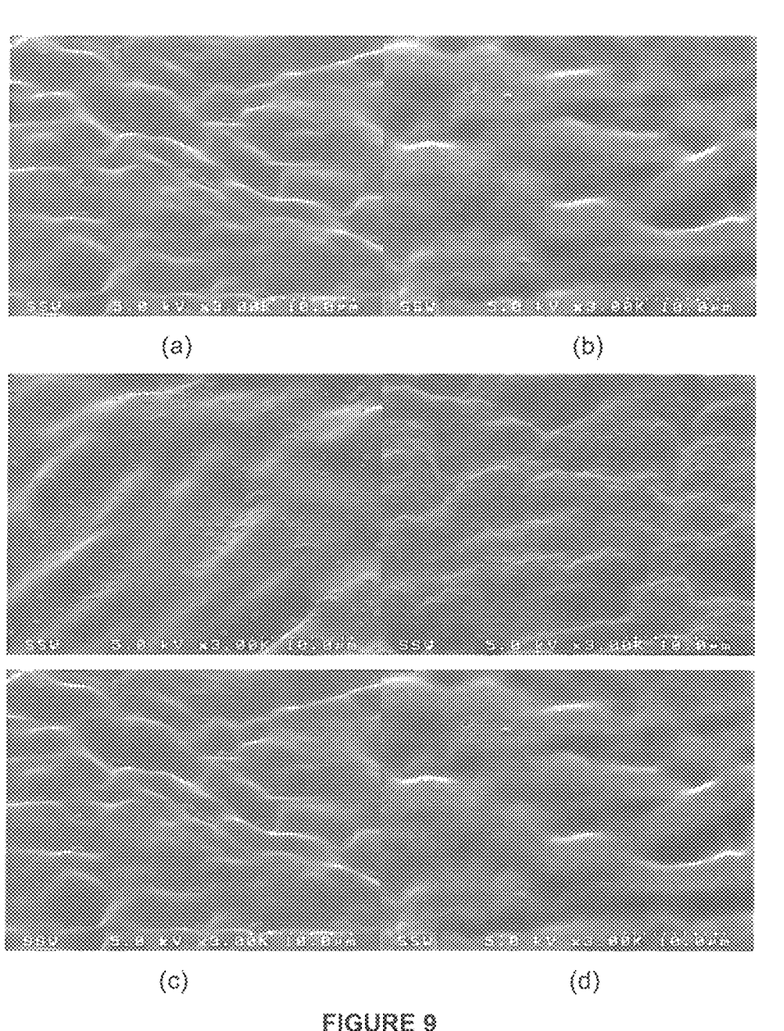
FIG. 9 shows results of adhesion tests on poly(SPMA) coated 3D printed samples obtained with bacteria: (A) *E. coli*, (B) control; and (C) *B. subtilis*, (D) control.
Figure 10:
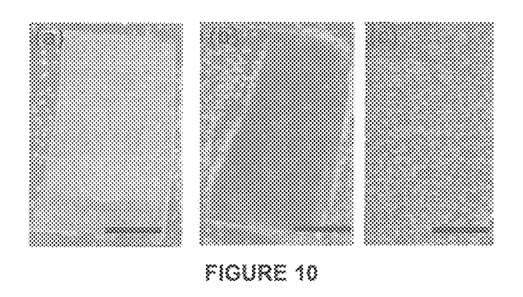
FIG. 10 shows results of bacterial inhibition tests on (A) control sample, (B) SPMA treated sample, and (C) bare area. Scale bar: 1 cm

The For both *E. coli* and *B. subtilis*, almost no bacteria were found on the poly(SPMA) treated samples (FIGS. 9(A) and (C)), while in contrast, the bacteria adhered everywhere on the control samples (FIGS. 9(B) and (D)). Furthermore, bacteria inhibition test were carried out on 3D printed flat samples. Bacteria were inoculated on the agar and the growth of bacteria was monitored to study the inhibition effect of modified sample. After 24 hours incubation, the growing colonies under control sample are very obvious (FIG. 10(A)). However, there was no visible colony forming after 24 hours for the SPMA treated sample, which indicates the grafted polymer brushes have inhibited the growth rate of bacteria (FIG. 10(B)).

Figure 11:
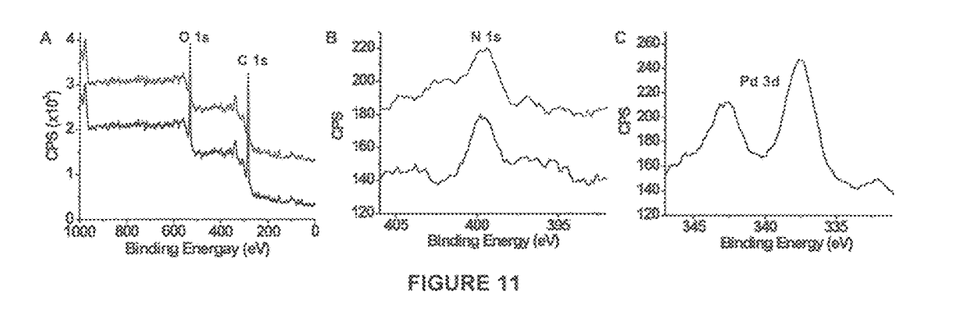
FIG. 11 shows: (A) XPS survey spectra of poly(METAC) grafted i-cube before (bottom curve) and after (top curve) ion exchange in an (NH$_4$)$_2$PdCl$_4$ aqueous solution; (B) high resolution XPS spectra in N1s region of poly(METAC) grafted i-cube before (bottom curve) and after (top curve) ion exchange; and (C) high resolution XPS spectra in Pd 3d region of a poly(METAC) grafted i-cube after ion exchange.
Figure 12:
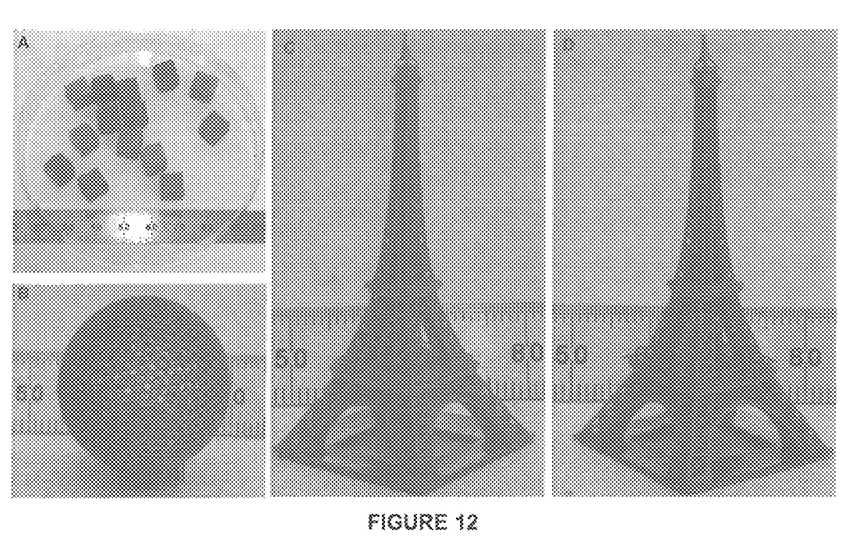
FIG. 12 shows photographs of (A) Cu- and Ni-coated i-cubes, (B) a Ni-coated hollow ball, and (C) Cu- and (D) Ni-coated Eiffel Tower.

In another demonstration of surface modification of a 3D printed object, the surface of an i-object was modified to form a polyelectrolyte-type surface, which was subsequently metalized by electroless plating. Poly(2-methacryloyloxy ethyl trimethylammonium) poly(METAC) was grafted onto a surface by polymerization of METAC by SI-ATRP. The successful grafting of poly(METAC) was indicated by X-ray photoelectron spectroscopy. The presence of N are attributable to the formation of a poly(METAC) coating (FIGS. 11(A) and 11(B)). After ion exchange in $(NH_4)_2PdCl_4$ aqueous solution, Pd 3d5/2 and 3d3/2 signals at 342.5 eV and 337.0 eV respectively (FIG. 11(C)) indicate successful loading of $PdCl_4^{2-}$ moieties due to their high affinity to quaternary ammonium of poly(METAC). The loaded Pd moieties act as effective catalytic sites for subsequent electroless plating of metal. Cu- and Ni-coated i-cubes were prepared, as shown FIG. 12(A). Basically, we can fabricate any metal-coated objects with complicated 3D structures. For proof-of-concept purpose, Ni-coated hollow ball and Cu- and Ni-coated Eiffel Tower were fabricated, as shown in FIGS. 12 (B) to (D), respectively.

The foregoing examples of surface modification are suitable for tuning the properties of an exposed surface of a printed object be it an exterior or interior surface. Such modification can thus be of 3D printed objects having channel structures, such as 3D electronics and 3D microfluidics. The printed structure can be selectively functionalized by injecting solutions into the channel structure only. A 3D printed circuit is shown here as a proof-of-concept, which includes both grafting polymer onto the inner surface of the channel and metallization process.

Figure 13:
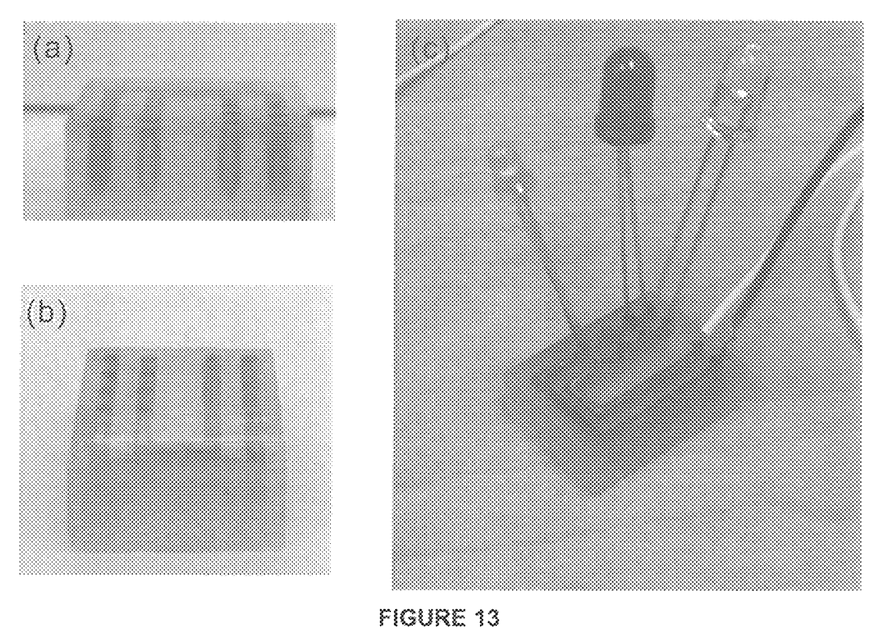
FIG. 13 shows (A) and (B) side views of a 3D printed channel structure with inner surface coated with copper, and (C) a demonstration of 3D circuit with three lit LEDs.

In one example of inner surface modification application, a 3D printed object with channel structures was functionalized, with the interior surface being modified to form a metalized surface. First, the inner surface of a printed channel was grafted with poly(METAC) by polymerization of METAC by SI-ATRP, then Pd moieties were loaded onto the surface to act as catalytic sites for electroless plating of copper layer, as shown in FIGS. 13(A) and 13(B). In another example, modification of the inner surface of a 3D circuit was fabricated as shown in FIG. 13(C) which shows electrical conductance of the metalized channel surface.

The examples described herein demonstrate a facile and effective approach to fabricating functional structural materials/devices by 3D printing. Initiator integrated structural materials were created by adding an initiator monomer into the resin base of the MiiCraft 3D printer, from which the SI-ATRP endows the 3D printed materials with tunable surface properties, such as hydrophobicity and hydrophilicity, anti-bacterial properties, and metalized surfaces.

The initiator-integrated strategy for functional structural materials by 3D printing is compatible with various types of surface-initiated technologies such as reversible addition-fragmentation chain-transfer (RAFT) polymerization, 'click' polymerization, and ring-opening metathesis polymerization (ROMP) by simply selecting different initiator monomers with specific functional groups.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims.

REFERENCES (1) Geissler, M.; Xia, Y. N. Adv. Mater. 2004, 16, 1249.
(2) Villar, G.; Graham, A. D.; Bayley, H. Science 2013, 340, 48.
(3) Derby, B. Science 2012, 338, 921.
(4) Duarte Campos, D. F.; Blaeser, A.; Weber, M.; Jakel, J.; Neuss, S.; Jahnen-Dechent, W.; Fischer, H. Biofabrication 2013, 5, 015003.
(5) Ovsianikov, A.; Gruene, M.; Pflaum, M.; Koch, L.; Maiorana, F.; Wilhelmi, M.; Haverich, A.; Chichkov, B. Biofabrication 2010, 2. 014104.
(6) Ahn, S. H.; Lee, H. J.; Kim, G. H. Biomacromolecules 2011, 12, 4256.
(7) Fedorovich, N. E.; Swennen, I.; Girones, J.; Moroni, L.; van Blitterswijk, C. A.; Schacht, E.; Alblas, J.; Dhert, W. J. A. Biomacromolecules 2009, 10, 1689.

(8) Kitson, P. J.; Rosnes, M. H.; Sans, V.; Dragone, V.; Cronin, L. Lab Chip 2012, 12, 3267.

(9) Symes, M. D.; Kitson, P. J.; Yan, J.; Richmond, C. J.; Cooper, G. J. T.; Bowman, R. W.; Vilbrandt, T.; Cronin, L. Nat. Chem. 2012, 4, 349.

(10) Wu, C.; Fan, W.; Zhou, Y.; Luo, Y.; Gelinsky, M.; Chang, J.; Xiao, Y. J. Mater. Chem. 2012, 22, 12288.

(11) Melcher, R.; Martins, S.; Travitzky, N.; Greil, P. Mater. Lett. 2006, 60, 572.

(12) Lopes, A. J.; MacDonald, E.; Wicker, R. B. Rapid Prototyping J. 2012, 18, 129.

(13) Barahman, M.; Lyons, A. M. Langmuir 2011, 27, 9902.

(14) Sun, K.; Wei, T.-S.; Ahn, B. Y.; Seo, J. Y.; Dillon, S. J.; Lewis, J. A. Adv. Mater. 2013, DOI: 10.1002/adma.20130136.

(15) Pham, D. T.; Gault, R. S. Int. J. Mach. Tool Manu. 1998, 38, 1257.

(16) Wu, Y.; Huang, Y.; Ma, H. J. Am. Chem. Soc. 2007, 129, 7226.

(17) Liu, X.; Wu, Y.; Gao, Y.; Wang, J.; Li, Z.; Han, J.; Jin, G.; Ma, H. J. Mater. Chem. 2012, 22, 6327.

(18) Wang, J. S.; Matyjaszewski, K. J. Am. Chem. Soc. 1995, 117, 5614.

(19) Li, B.; Yu, B.; Huck, W. T. S.; Liu, W.; Zhou, F. J. Am. Chem. Soc. 2013, 135, 1708.

(20) Zhou, F.; Zheng, Z.; Yu, B.; Liu, W.; Huck, W. T. S. J. Am. Chem. Soc. 2006, 128, 16253.

(21) Xin, B.; Hao, J. Chem. Soc. Rev. 2010, 39, 769.

(22) Calvo, A.; Yameen, B.; Williams, F. J.; Soler-Illia, G. J. A. A.; Azzaroni, O. J. Am. Chem. Soc. 2009, 131, 10866.

(23) Wang, X.; Hu, H.; Shen, Y.; Zhou, X.; Zheng, Z. Adv. Mater. 2011, 23, 3090.

The invention claimed is:

1. A method of printing a three-dimensional object having a surface coating by three-dimensional printing, the method comprising:
   (i) providing a three-dimensional printable liquid resin, the three-dimensional printable resin including a mixture of first and second molecules and a photoinitiator, programming a 3D printer to produce a digital 3D model of the object to be printed and digitally slicing the 3D model into a series of 2D layers, depositing the mixture layer-by-layer using said 3D printer and copolymerizing the first and second molecules in each layer using patterns of said 2D layers to control UV projection onto each layer to solidify the liquid resin in a layer-by-layer sequence until the object has been produced, wherein the first molecule is a cross-linking first monomer and the second molecule is a second monomer comprising first and second functional groups wherein the first functional group links with the first monomer during the copolymerization to form a three-dimensional object, the outer surface of the three-dimensional object being formed with the second functional group exposed at the outer surface of said three-dimensional object for chemical reaction with a third molecule.

2. The method of claim 1, further comprising:
   (ii) reacting the third molecule with the second functional group to covalently link the third molecule to the surface of the three-dimensional object.

3. The method of claim 2, wherein the copolymerization is promoted under first catalytic conditions, and the reaction of the third molecule and the second functional group is promoted under second catalytic conditions.

4. The method of claim 2, wherein the copolymerization is a photopolymerization, and the second functional group of the second monomer and the third molecule form covalent bonds with each other during the reacting step by a metal-catalyzed reaction.

5. The method of claim 4, wherein third molecule comprises a third monomer comprising a polymerizable functional group, wherein the functional group of the third molecule reacts with the second functional group to covalently link the third molecule to the surface of the three-dimensional object in reacting step (ii) and the functional group of the third molecule undergoes homopolymerization in reacting step (ii).

6. The method of claim 5, wherein the cross-linking first monomer is a diacrylate.

7. The method of claim 6, wherein the first molecule is a diacrylate selected from the group consisting of:

where n=1 to 100; m=1 to 100, p=1 to 100, and q=1 to 100.

8. The method of claim 7, wherein said second molecule is selected from the group consisting of 2-(2-bromoisobutyrloxy) ethyl methacrylate and 2-(2-bromoisobutyrloxy) ethyl acrylate.

9. The method of claim 8, wherein the third molecule comprises $CH_2=C(CH_3)C(O)R$ wherein R is selected from the group consisting of:
—$O(CH_2CH_2O)_rH$ wherein r is from 1 to 50;
—$OCH_2CH_2CH_2SO_3K$;
—$OCH_2CH_2(CF_2)_tCF_3$, wherein t is from 1 to 7;
—$OCH_2CH_2N(CH_3)_3Cl$.

10. The method of claim 9, wherein R is —OCH$_2$CH$_2$N(CH$_3$)$_3$Cl, and further comprising, subsequent to step (ii), forming a metalized surface on the exterior of the three-dimensional object by electroless plating.

11. The method of claim 10, wherein the metalized surface comprises copper or nickel; forming the metalized surface comprises exposing the product of step (ii) to PdCl$_4^{2-}$ and a salt of Cu(II) or exposing the product of step (ii) to PdCl$_4^{2-}$ and a salt of Ni(II).

12. The method of any one claims 11, wherein the first molecule and the second molecule are present in the mixture of step (i) in a ratio of about 95:5 (wt %:wt %).

13. The method of claim 5, wherein the cross-linking first monomer is a dimethacrylate.

* * * * *